United States Patent
Hung et al.

(10) Patent No.: US 9,383,983 B2
(45) Date of Patent: Jul. 5, 2016

(54) METHOD AND SYSTEM TO IMPOSE ENTERPRISE SECURITY MECHANISMS THROUGHOUT A MOBILE APPLICATION LIFECYCLE

(71) Applicant: VMware, Inc., Palo Alto, CA (US)

(72) Inventors: Perry Hung, Cambridge, MA (US); Harvey Tuch, Cambridge, MA (US)

(73) Assignee: AirWatch LLC, Atlanta, GA (US)

( * ) Notice: Subject to any disclaimer, the term of this patent is extended or adjusted under 35 U.S.C. 154(b) by 202 days.

(21) Appl. No.: 13/918,511

(22) Filed: Jun. 14, 2013

(65) Prior Publication Data

US 2014/0059703 A1    Feb. 27, 2014

Related U.S. Application Data

(60) Provisional application No. 61/692,857, filed on Aug. 24, 2012.

(51) Int. Cl.
G06F 7/04         (2006.01)
G06F 9/445        (2006.01)
G06F 21/54        (2013.01)
(Continued)

(52) U.S. Cl.
CPC .. *G06F 8/54* (2013.01); *G06F 8/61* (2013.01); *G06F 9/44521* (2013.01); *G06F 9/54* (2013.01); *G06F 21/31* (2013.01); *G06F 21/53* (2013.01); *G06F 21/54* (2013.01); *G06F 21/602* (2013.01); *G06F 21/604* (2013.01); *H04L 63/10* (2013.01); *H04L 63/20* (2013.01); *H04L 67/146* (2013.01); *H04W 12/02* (2013.01); *G06F 2221/2107* (2013.01); *G06F 2221/2143* (2013.01);

(Continued)

(58) Field of Classification Search
CPC .............. H04L 9/00; H04L 9/32; G06F 21/30
USPC .............................. 726/1–3, 4; 455/410–411
See application file for complete search history.

(56) References Cited

U.S. PATENT DOCUMENTS 6,026,235 A    2/2000  Shaughnessy
6,212,632 B1   4/2001  Surine et al.
(Continued)

OTHER PUBLICATIONS

Stephen Deasy et al., "Method and System for Facilitating Isolated Workspace for Applications", U.S. Appl. No. 13/595,881, filed Aug. 27, 2012.

(Continued)

*Primary Examiner* — Dede Zecher
*Assistant Examiner* — Viral Lakhia
(74) *Attorney, Agent, or Firm* — Thomas | Horstemeyer, LLP

(57) ABSTRACT

Particular embodiments provide a method to authenticate a user of an application running on a mobile operating system (OS) installed on a mobile device, wherein the mobile OS invokes callback methods of the application upon making changes to an execution state of the application. Code embedded into the application causes the application to communicate with a management agent installed in the mobile OS upon invocation of a hooked callback method. Upon invocation of the hooked callback method, the embedded code assesses whether the user should be provided an authentication challenge prior to enabling the application to run in the foreground, and presents the authentication challenge if necessary. Finally, the embedded code returns execution control from the management agent back to the application wherein the application executes the at least one callback method prior to running in the foreground.

14 Claims, 5 Drawing Sheets

(51) Int. Cl.

| | |
|---|---|
| *G06F 9/54* | (2006.01) |
| *G06F 21/31* | (2013.01) |
| *G06F 21/60* | (2013.01) |
| *G06F 21/53* | (2013.01) |
| *H04W 12/02* | (2009.01) |
| *H04L 29/08* | (2006.01) |
| *H04L 29/06* | (2006.01) |
| *H04W 12/00* | (2009.01) |

(52) U.S. Cl.
CPC ..... *G06F2221/2149* (2013.01); *H04L 63/0272* (2013.01); *H04W 12/00* (2013.01)

(56) References Cited

U.S. PATENT DOCUMENTS

| | | | |
|---|---|---|---|
| 6,405,316 B1 | 6/2002 | Krishnan et al. | |
| 6,463,583 B1 | 10/2002 | Hammond | |
| 6,529,985 B1 | 3/2003 | Deianov et al. | |
| 6,735,774 B1 | 5/2004 | Krishnaswamy | |
| 6,959,441 B2 | 10/2005 | Moore | |
| 7,111,323 B1* | 9/2006 | Bhatia | H04L 63/0815 707/999.009 |
| 7,280,530 B2* | 10/2007 | Chang | H04M 7/0057 370/352 |
| 7,296,274 B2 | 11/2007 | Cohen et al. | |
| 7,552,446 B1* | 6/2009 | Sosnovsky | G06F 1/14 713/501 |
| 7,565,665 B2 | 7/2009 | Forin et al. | |
| 7,792,546 B2* | 9/2010 | Toy | H04M 3/42314 455/554.1 |
| 7,992,156 B1 | 8/2011 | Wang | |
| 8,233,882 B2* | 7/2012 | Rogel | G06F 21/31 455/411 |
| 8,595,255 B2* | 11/2013 | Krishnaprasad | G06F 17/30427 707/781 |
| 8,707,451 B2* | 4/2014 | Ture | G06F 17/30864 726/1 |
| 8,769,643 B1* | 7/2014 | Ben Ayed | 726/5 |
| 8,819,800 B2* | 8/2014 | Gao | G06F 21/335 726/9 |
| 2004/0006637 A1 | 1/2004 | Kuacharoen et al. | |
| 2005/0108721 A1 | 5/2005 | Oshima et al. | |
| 2005/0108733 A1 | 5/2005 | Bermudez et al. | |
| 2005/0246705 A1 | 11/2005 | Etelson et al. | |
| 2006/0161973 A1 | 7/2006 | Royer et al. | |
| 2008/0034071 A1 | 2/2008 | Wilkinson et al. | |
| 2008/0134347 A1 | 6/2008 | Goyal et al. | |
| 2008/0250400 A1 | 10/2008 | Vertes | |
| 2008/0282266 A1 | 11/2008 | Kabanov | |
| 2009/0164994 A1 | 6/2009 | Vasilevsky et al. | |
| 2009/0227274 A1 | 9/2009 | Adler et al. | |
| 2009/0240947 A1 | 9/2009 | Goyal et al. | |
| 2009/0249335 A1 | 10/2009 | Vasilevsky et al. | |
| 2010/0299719 A1 | 11/2010 | Burks et al. | |
| 2010/0306547 A1 | 12/2010 | Fallows et al. | |
| 2010/0333088 A1* | 12/2010 | Rogel et al. | 718/1 |
| 2011/0030047 A1* | 2/2011 | Gao | G06F 21/335 726/9 |
| 2011/0219234 A1 | 9/2011 | Bogner | |
| 2011/0252240 A1 | 10/2011 | Freedman et al. | |
| 2011/0276987 A1 | 11/2011 | Pope et al. | |
| 2012/0036552 A1* | 2/2012 | Dare | H04L 41/0253 726/1 |
| 2012/0149338 A1* | 6/2012 | Roundtree | 455/411 |
| 2012/0204126 A1* | 8/2012 | Yoshimura | 715/778 |
| 2013/0007848 A1* | 1/2013 | Chaskar | H04W 12/12 726/4 |
| 2013/0091543 A1 | 4/2013 | Wade et al. | |
| 2013/0160072 A1 | 6/2013 | Reus et al. | |
| 2013/0167250 A1 | 6/2013 | Balasubramanian | |
| 2013/0239197 A1 | 9/2013 | Kato et al. | |
| 2014/0007048 A1 | 1/2014 | Qureshi et al. | |
| 2014/0007183 A1* | 1/2014 | Qureshi et al. | 726/1 |
| 2014/0007205 A1* | 1/2014 | Oikonomou | G06F 21/35 726/6 |
| 2014/0032491 A1 | 1/2014 | Neerincx et al. | |
| 2014/0059525 A1 | 2/2014 | Jawa et al. | |
| 2014/0059573 A1 | 2/2014 | Jawa et al. | |
| 2014/0059642 A1 | 2/2014 | Deasy et al. | |
| 2014/0059703 A1 | 2/2014 | Hung et al. | |
| 2014/0289511 A1 | 9/2014 | Tuch et al. | |

OTHER PUBLICATIONS

Manish Jawa et al., "Method and System for Facilitating Replacement of System Calls", U.S. Appl. No. 13/756,347, filed Jan. 31, 2013.

Manish Jawa et al., "Method and System for Identifying and Replacing System Calls", U.S. Appl. No. 13/775,047, filed Feb. 22, 2013.

Riley et al. "Multi-Aspect Profiling of Kernal Rootkit Behavior" ACM,2009, 14 pages.

Sysmagazine, "Redirection of Functions in Mach-O libraries", Sysmagazine, 28 pages Apr. 2011.

Lozzo, Vincent, "Let Your Mach-O Fly", black Hat Briefings, Feb. 2009, 42 pages https://www.blackhat.com/presentations/bh-dc-09/lozzo-Macho-on the fil.pdf.

Mach Developer Library—Mach-O Programming Topics, /developertools/conceptual/machotopics/1-articles/indirect_addressubg,html, February A17.

Apple Inc., "OS X ABI Mach-O File Format Reference", 2009, 42 Pages.

David Schuetz, "The IOS MDM Protocol,"Intrepidus Group, Inc.; Aug. 3, 2011, 29 pgs.

"Over-the-Air Profile Delivery Concepts," http://developer.apple.com/library/ios#documentation/networkinginternet/conceptual/iphonetoaconfiguration/OTASecurity/OTASecurity.html; Feb. 12, 2013, 6 pgs.

"Developer Forums: Retrieving Certificate from Keychain," p. 2, https://devforums.apple.com/thread/3336?start=25&start=0; Mar. 20, 2013, 5 pgs.

"Developer Forums: Retrieving Certificate from Keychain," p. 1, https://devforums.apple.com/message/11142#11142; Mar. 20, 2013, 13 pgs.

"Verify/Check to see if a Configuration Profile has been installed on iPhone," Careers 2.0 by stackoverflow, http://stackoverflow.com/questions/2195673/verify-check-to-see-if-a-configuration-profile-has-been-installed-on-iphone; Mar. 20, 2013, 2 pgs.

International Search Report and Written Opinion dated Dec. 2, 2013, Application No. PCT/US2013/056675, international filing date of Aug. 26, 2013, 8 pgs.

* cited by examiner

METHOD AND SYSTEM TO IMPOSE ENTERPRISE SECURITY MECHANISMS THROUGHOUT A MOBILE APPLICATION LIFECYCLE

CROSS REFERENCE TO RELATED APPLICATIONS

The present application claims priority to U.S. Provisional Patent Application No. 61/692,857, filed on Aug. 24, 2012 and entitled "Secure Inter-Process Communication and Virtual Workspaces on Mobile Device Operating Systems," the entire contents of which are hereby incorporated by reference. The present application is also related to U.S. patent application Ser. No. 13/595,881, filed 27 Aug. 2012 and entitled "Method and System for Facilitating Isolated Workspace for Applications," U.S. patent application Ser. No. 13/756,347, filed 31 Jan. 2013 and entitled "Method and System for Facilitating Replacement of System Calls," and U.S. patent application Ser. No. 13/775,047, filed 22 Feb. 2013 and entitled "Method and System for Identifying and Replacing System Calls," the entire contents of each of the foregoing which are hereby incorporated by reference and are generally referred to, including U.S. Provisional Patent Application No. 61/692,857, herein as the "Related Applications.".

BACKGROUND

A user owning a personal mobile device (e.g., smartphone, tablet, etc.) may want to install certain "workplace" mobile applications (e.g., email, calendar, etc.) relating to his work as an employee of a business on his personal mobile device rather than carry an additional mobile device for work purposes. In situations where an employer permits the user to utilize his personal mobile device to install and run a workspace application, the employer's IT department may need to impose certain security measures or policies on the user's personal device to ensure that enterprise data that is accessed from or stored on the personal mobile device is secure. For example, the approaches described in the Related Applications generally utilize an application management agent installed on the user's personal mobile device to assist in imposing security policies only around enterprise data and enterprise related applications included in a "virtual enterprise workspace."

As described in the Related Applications, a technique of "application wrapping" can be used to "hook" into library function call tables of an already compiled application and make use of language runtime reflection techniques to inject new calls that are executed by the "wrapped" application to perform actions not otherwise compiled into the application in its original unwrapped form. Once the wrapped application has been created, the enterprise can provide the wrapped application for installation by employees on their personal mobile devices. When the wrapped application is then launched on a user's device, the "hooks" in the wrapped application execute the functionality in these new calls when the new calls get triggered during the application's execution flow. For example, one such hook may cause the wrapped application to communicate with servers at the enterprise using a VPN channel established by the application management agent rather than an unprotected channel while another hook may cause the wrapped application to "register" (e.g., via an authentication process) with the application management agent as an "enterprise approved" application upon an initial launch of the wrapped application (e.g., such registration enabling the wrapped application to access security related services provided by the application management agent to maintain the virtual enterprise workspace).

During a "lifecycle" of a launched application on a mobile device, the application may move through various stages of execution state, from its initial launch to its ultimate termination. For example, the execution state of the application may move into a "suspended" or a "background" state when a phone call is received by the mobile device (i.e., the phone call application moves to the foreground) or may be moved into an "active" or "foreground" state, for example, when the employee selects its icon from a home screen or from a list of launched applications. These changes in execution state of a wrapped application during its lifecycle may also raise security policy considerations for a virtual enterprise workspace. For example, if the employee has a wrapped enterprise approved application suspended or running in the background while he is engaged on a lengthy personal phone call, the enterprise may desire that the virtual enterprise workspace on the employee's personal device present a PIN lock screen or other authentication challenge to the employee before allowing the employee to bring the suspended or background running wrapped enterprise approved applications to the foreground after the employee completes his personal phone call. What is needed is a way to leverage the ability to inject calls into a wrapped application so that security or other enterprise considerations may be addressed at appropriate times and during different stages of an application's entire lifecycle (e.g., when an application is launched, terminated, suspended, goes into the background, goes into the foreground, etc.).

SUMMARY

Particular embodiments provide a method to authenticate a user of an application running on a mobile operating system (OS) installed on a mobile device, wherein the mobile OS invokes callback methods of the application upon making changes to an execution state of the application. Code may be embedded into an executable version of the application prior to installation of the application on the mobile device, whereby the embedded code causes the application to communicate with a management agent installed in the mobile OS upon invocation of at least one of the callback methods of the application by the mobile OS and wherein the at least one callback method is invoked by the mobile OS when the execution state of the application is about to be changed so that the application runs in the foreground of the mobile device. Upon invocation of the at least one callback method of the application by the mobile OS, the embedded code may assess whether the user should be provided an authentication challenge prior to enabling the application to run in the foreground. If so, the mobile OS may switch execution control from the application to the management agent to enable the management agent to present the authentication challenge to the user through a user interface of the mobile device. In some embodiments, the embedded code may request the management agent to register the application as a business-approved application if the application has not been registered. Finally, the mobile OS may return execution control from the management agent back to the application wherein the application executes the at least one callback method prior to running in the foreground.

In particular embodiments, the assessment may involve determining whether a timeout value stored in the mobile device has expired. The timeout value may correspond to whether any of plurality of business-approved applications installed on the mobile device has been recently used.

DETAILED DESCRIPTION

Embodiments described herein enable an enterprise to provide wrapped applications that invoke custom functionality during certain stages in the applications' lifecycle (e.g., during certain points in the execution flow of the application on a mobile device) by interposing such functionality into the applications' "lifecycle" callback methods (as further described herein), for example, to enforce security policies.

Figure 1:
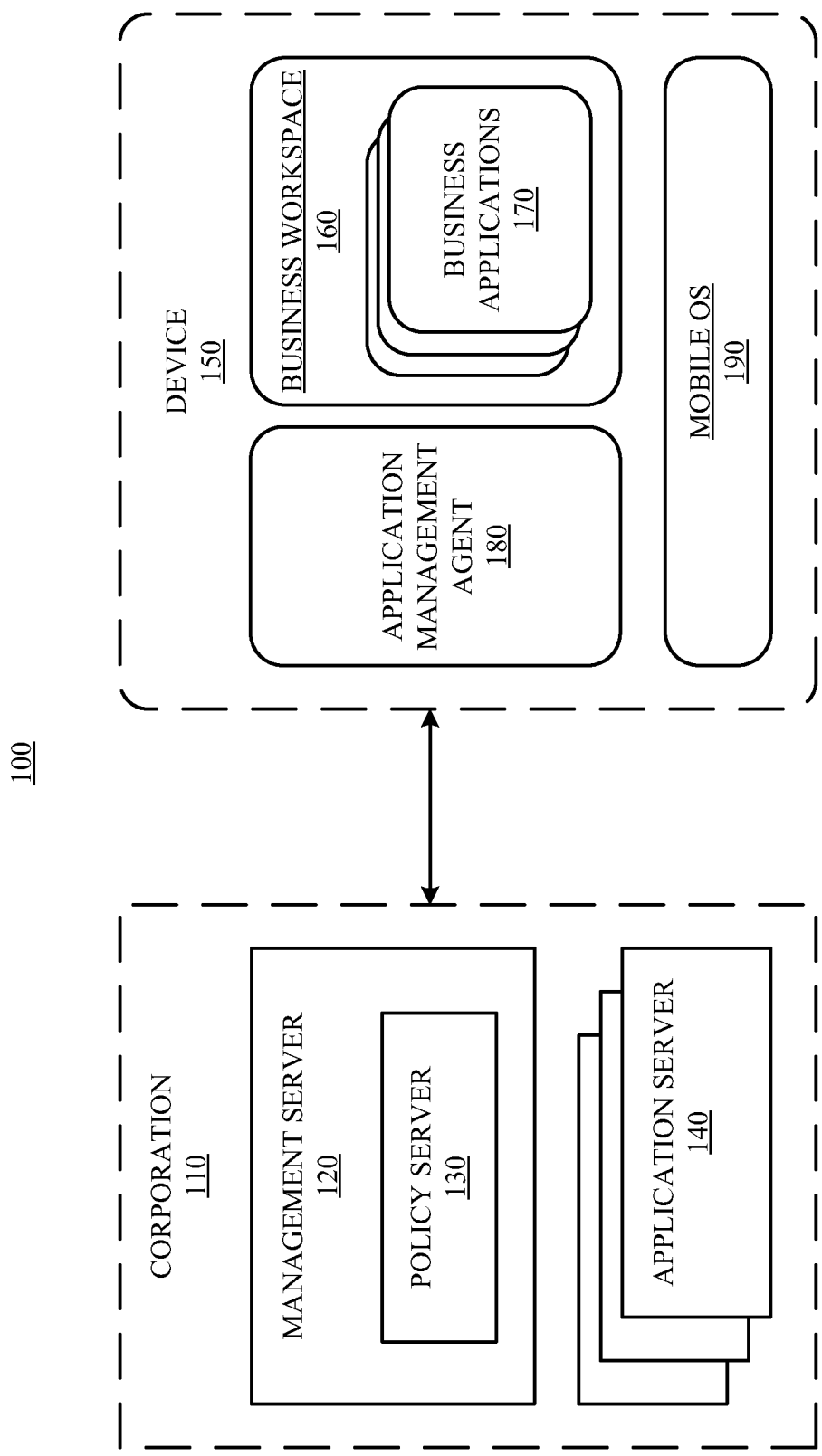
FIG. 1 depicts an example computing environment in which embodiments herein may be practiced.

FIG. 1 depicts an example computing environment 100 in which embodiments described herein may be implemented. A management server 120 runs within a corporation 110 and manages security policies (using policy server 130) for workplace-related applications (provided by application servers 140. An employee may create on their personal mobile device 150 a "virtual" business workspace 160 consisting, for example, of a number of corporate-approved wrapped business applications 170 (e.g., PIM related applications such as email, calendar, contacts, CRM applications, etc.). In the embodiment of FIG. 1, virtual business workspace 160 generally enforces corporate security policies received through a management server 120 and is implemented through an application management agent 180 running on personal mobile device 150 that operates in conjunction with a mobile operating system (OS) 190 to control user access to applications 170 and secure communications between applications 170 and corporation 110. For example, when the employee attempts to launch a workspace application 170 on his personal mobile device 150, as further discussed herein, application management agent 180 may present a PIN lock screen or other authentication challenge to the employee prior to permitting workspace application 170 to be launched.

In order to ensure that the execution of workspace application 170 conforms with the security policies of corporation 110 during the workspace application 170 entire lifecycle, as previously discussed, corporation 110 wraps workspace application 170 prior to providing workspace application 170 to the employee for installation on mobile device 150 in order to hook, interpose or otherwise insert custom functionality or tasks into particular callback methods that manage "state transitions" (e.g., moving the application into the background during a phone call or when the user pushes a "home" button on the mobile device, launching the application, terminating the application, moving the application into the foreground, etc.) in the lifecycle of workspace application 170. Such custom functionality would check compliance with or otherwise enforce certain corporate security policies (e.g., registration, authentication, etc.) during such state transitions.

For example, in an embodiment where mobile OS 190 is a version of iOS from Apple Inc. ("Apple"), the lifecycle of an iOS version of workspace application 170 is managed by an application delegate object (UIApplicationDelegate) instantiated within workspace application 170 whose primary function is to provide a mechanism for the creator of workspace application 170 to insert functionality or tasks that are executed upon the state transitions of the lifecycle of workspace application 170. The UIApplicationDelegate object includes a number of callback methods to handle these lifecycle state transitions (e.g., entering foreground, entering background, terminating, launching, etc.) and allow workspace application 170 to perform appropriate tasks at each state:

application:didFinishLaunchingWithOptions: iOS causes workspace application 170 to invoke this callback method in its implementation of UIApplicationDelegate to perform any final initialization tasks before the user interface of workspace application 170 is displayed to the user;

applicationDidBecomeActive: iOS causes workspace application 170 to invoke this callback method in its implementation of UIApplicationDelegate to perform any final preparation tasks after workspace application 170 becomes active and just before it moves to the foreground;

applicationWillEnterForeground: iOS causes workspace application 170 to invoke this callback method in its implementation of UIApplicationDelegate to perform tasks to be handled while workspace application 170 moves out of the background and is not yet active;

applicationWillResignActive: iOS causes workspace application 170 to invoke this callback method in its implementation of UIApplicationDelegate to perform quiescing tasks as workspace application 170 transitions away from being in the foreground;

applicationDidEnterBackground: iOS causes workspace application 170 to invoke this callback method in its implementation of UIApplicationDelegate to perform tasks to prepare to enter a suspended state and then be either restored or terminated;

applicationWillTerminate: iOS causes workspace application 170 to invoke this callback method in its implementation of UIApplicationDelegate to perform any necessary tasks during termination of workspace application 170.

Figure 2:
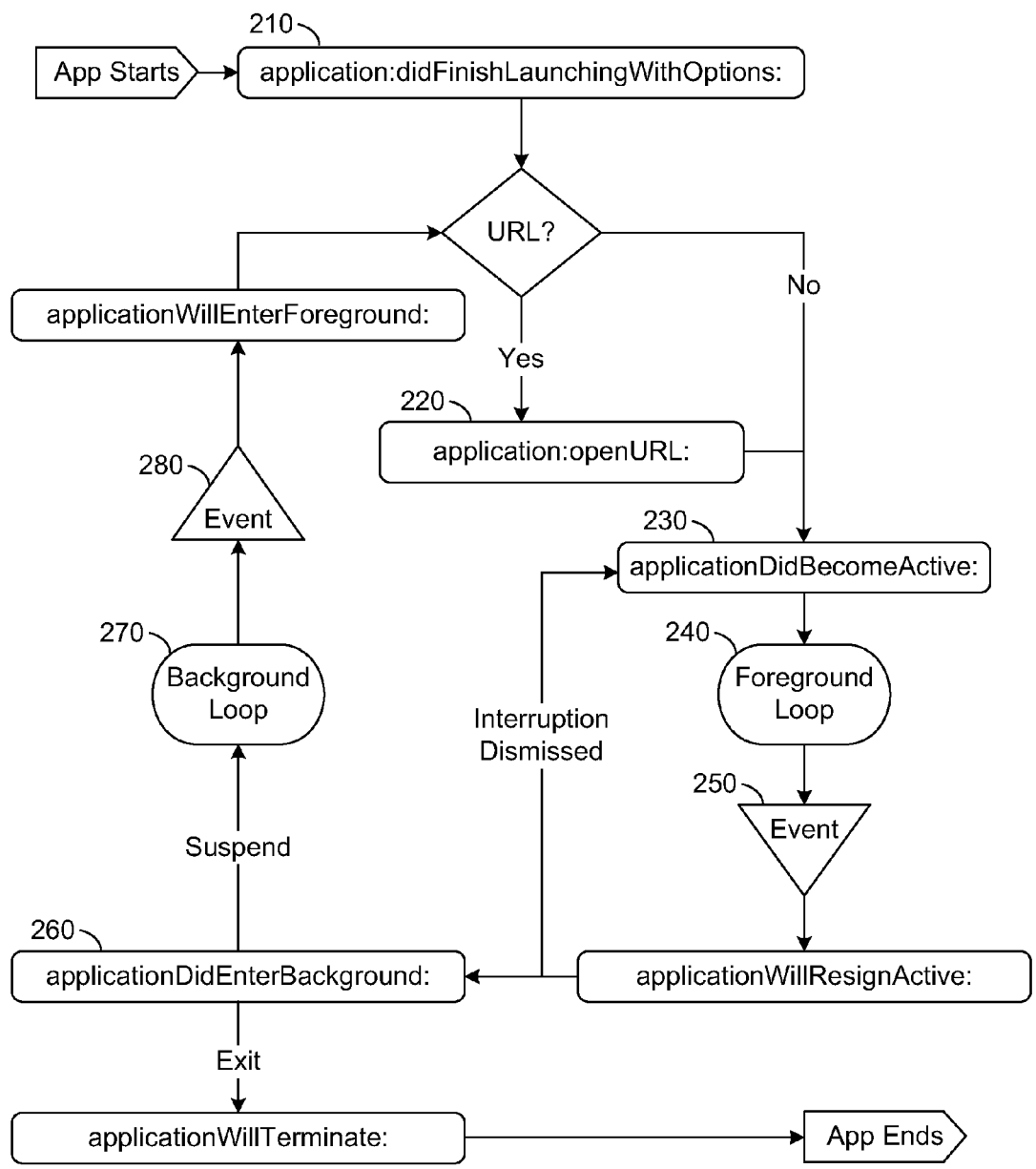
FIG. 2 presents a flowchart illustrating a standard lifecycle flow for various callback methods for a mobile application.

FIG. 2 presents a flowchart illustrating a standard lifecycle flow for the various callback methods described above for a mobile application running on Apple's iOS 5.x operating system. It should be recognized that the lifecycle flow and callback methods of FIG. 2 that represent various state transitions during the lifecycle of an iOS mobile application are merely exemplary and that alternative embodiments that utilize a different mobile OS 190 other than iOS (e.g., Android, Blackberry, etc.) may have different state transitions and may utilize different callback or similar-type mechanisms workspace application 170 in order provide workspace application 170 opportunities to perform tasks during its lifecycle state transitions.

In addition to the tasks or functionality already written by the creator of workspace application 170 for the lifecycle callback methods that relate to the core functions of workspace application 170, in embodiments described herein, corporation 110 hooks additional tasks or functionality into these lifecycle callback methods to, for example, enforce corporate security policies or perform any other desired custom tasks desired (e.g., by hooking into the UIApplicationDelegate object in an iOS embodiment, etc.). In other embodiments, rather than utilizing hooking techniques, corporation 110 may provide certain SDKs (software development kits) and/or APIs (application program interfaces) such that the original creator of workspace application 170 may write such security-related tasks or functionalities into the lifecycle callback methods (thereby obviating a need to wrap or hook workspace application 170).

In one embodiment, corporation 110 may desire that workspace application 170 (or, alternatively, application management agent 180 when invoked by workspace application 170) present a PIN lock screen when workspace application 170 (1) is initially launched by the end user, or (2) transitions to the foreground after having been placed in the background. For an iOS embodiment, as depicted in the lifecycle flow for iOS in FIG. 2, both of these cases (i.e., (1) initial launch, and (2) transition to foreground, sometimes referred to herein as "entry paths") ultimately cause iOS to invoke the applicationDidBecomeActive callback method of workspace application 170 prior to bringing workspace application 170 to the foreground. As such, as further detailed below, corporation 110 injects hooking code to present a PIN lock screen to the end user when the applicationDidBecomeActive callback method of workspace application 170 is invoked by iOS.

In an iOS embodiment, corporation 110, as part of its application wrapping process, can insert hooking code through a technique supported by iOS known as "method swizzling" that redirects the selector for a method (e.g., the applicationDidBecomeActive callback method) to an alternate implementation (e.g., method_exchangeImplementations (Method original, Method new)). Method swizzling operates by applying introspection to access the original method implementation and then applying reflection to redirect the code to use a hooked (i.e., alternate) implementation of a method at runtime. Introspection is a feature of certain programming languages (e.g., Objective C) to provide information about objects at runtime, such as names of methods of a class, type information for instance variables of a class, and the actual implementation (code) of methods of a class. Reflection is a feature of certain programming languages (e.g., Objective C) that enables a developer to perform a number of operations at runtime, such as adding new classes, adding methods to a class, and adding instance variables to a class. By using method swizzling, corporation 110 can hook into a callback method and redirect it to a hooked implementation of the method that interposes any necessary functions before calling the original implementation of the callback method.

Figure 3:
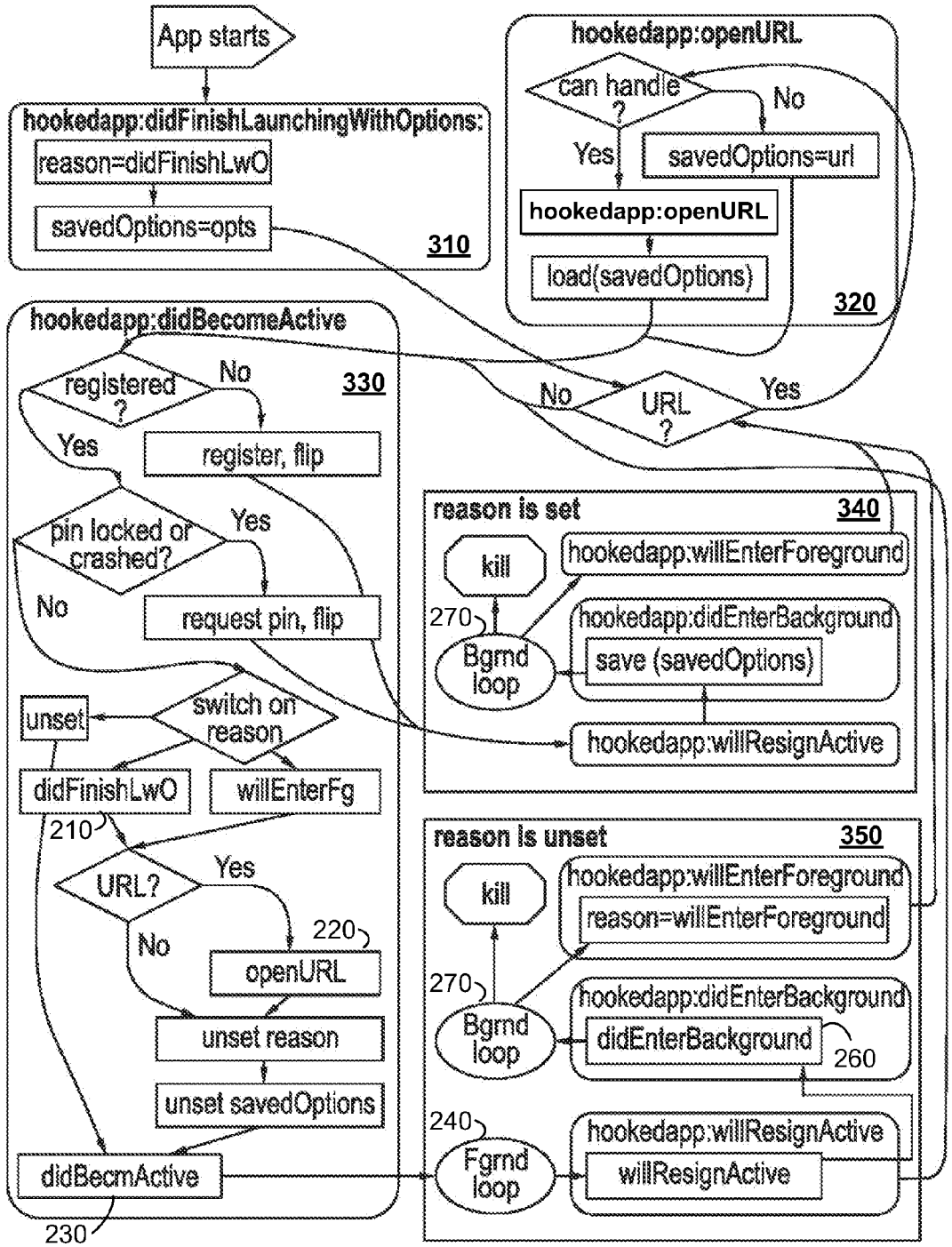
FIG. 3 presents one embodiment of a flowchart for hooking code that is inserted to interpose new tasks and functionality to enforce security policies of a corporation during the lifecycle of a workspace application depicted in FIG. 2.

FIG. 3 presents one embodiment of a flowchart for hooking code that is inserted to interpose new tasks and functionality to enforce security policies of a corporation during the lifecycle of a workspace application. Although the flow of hooking code in FIG. 3 corresponds to an iOS implementation that utilizes the lifecycle callback methods depicted in FIG. 2, it should be recognized that FIG. 3 is merely exemplary and that different flows for hooking code may be utilized in different embodiments depending upon the lifecycle callback mechanisms provided by particular mobile OSs.

As depicted in FIG. 3, a number of callback methods of the UIApplicationDelegate object (e.g., didFinishLaunchWithOptions, didBecomeActive, openURL, etc.) have been hooked during an application wrapping process to inject new tasks or functionality into workplace application 170.

For example, when the employee launches workspace application 170 on personal device 150, mobile OS 190 may ultimately trigger a callback into workspace application's 170 callback method application:didFinishLaunchingWithOptions (execution block 210 in FIG. 2), which is then intercepted by the injected hooked code thereby causing workspace application 170 to instead execute a hooked implementation of the method, hookedApp:didFinishLaunchingWithOptions (execution block 310 in FIG. 3). As depicted, the hooked implementation in execution block 310 causes workspace application 170 to record a specific value for a "reason" or "entry path" variable (e.g., reason=didFinishLwO) to indicate that a launch of workspace application 170 is occurring. This value is subsequently checked by other hooked implementations, such as the hookedApp: didBecomeActive method in execution block 330 in order to timely perform other security policy related tasks accordingly as described below. As can been seen in execution block 350, in alternative circumstances, other hooked implementations of other callback methods may record the reason or entry path as a different value (e.g., reason=willEnterForegound, which would indicate that workspace application 170 is moving from the background into the foreground). While execution block 310 does not call the original method of application:didFinishLaunchingWithOptions upon completion of the hooked implementation, FIG. 3 does indicate that the original method does ultimately get triggered within the hooked implementation of hookedApp:didBecomeActive in execution block 330 when corporate security related tasks such as application registration or user authentication have been completed.

Workspace application 170 similarly invokes a hooked implementation in execution block 320 (hookedApp: openURL), in lieu of mobile OS 190 invoking the application: openURL callback method as depicted in step 220. Execution block 320 (hookedApp:openURL) handles both launches and state transitions involving a URL resource in order to determine if the requested URL resource is a transition from application management agent 180—if so, the appropriate URL handler is called (hookedApp:openURL) and the previously-persisted saved options are loaded; otherwise the URL is noted as a launch option (savedOptions=url).

As further depicted in FIG. 3, execution block 330 (hookedApp:didBecomeActive) is triggered in workspace application 170 when mobile OS 190 invokes the callback method applicationDidBecomeActive as depicted in block 230 of FIG. 2. The hooked implementation in execution block 330 (hookedApp:didBecomeActive) includes functionality to (1) perform or confirm registration of workspace application 170 with virtual business workspace 160, as well as (2) perform or confirm user authentication (e.g., PIN lock) for access to virtual business workspace 160. In the embodiment of FIG. 3, if either the confirmation of registration or PIN lock fails (as further described below), then workspace application 170 initiates a transition to application management agent 180 (referred to as a "flip" in FIG. 3) so that application management agent 180 can manage the process of registering workspace application 170 or presenting an authentication challenge (e.g., new PIN lock screen) to the user.

In one embodiment, the hooking code in workspace application 170 that performs or confirms user authentication may check a "lease" or other timebound value that is stored in the memory or the file system of mobile OS 190 and only cryptographically accessible by workspace application 170 as a registered member of virtual business workspace 160. This lease or timebound value may be generally updated by application management agent 180 or workspace applications when they are, for example, running in the foreground. If the lease or timebound value indicates an expiration or timeout of a lease or time period (e.g., virtual business workspace 160 has been "inactive" for a period of time since neither application management agent 180 or any other workspace applications 170 have updated the value), the hooking code may, as previously discussed, then further request that execution flow "flip" or switch from workspace application 170 to application management agent 180 (e.g., via a URL call to application management agent 180 or any other inter-process communication, etc.) so that application management agent 180 can present a PIN lock screen or other authentication challenge to the employee before providing access to workspace application 170.

If both registration and user authentication checks succeed, then the security policies of corporation 110 have been satisfied, and based on the specific entry path or "reason" for triggering callback method 230 ("reason" indicates a launch event represented by didFinishLwO, or a move from background to the foreground represented by willEnterForeground), workspace application 170 (1) calls the original implementation of the appropriate callback method of the UIApplicationDelegate object (callback methods 210 or 260, or neither, if "reason" is null), (2) calls the original implementation of the method to access a URL (method 220) if necessary, (3) nullifies the values for "reason" and "savedOptions," and (4) calls the original implementation of applicationDidBecomeActive, after which point workspace application 170 is running in foreground run loop 240 (in execution block 350).

Execution blocks 340 and 350 similarly depict the actions taken by the hooked implementations of certain callback methods (e.g., hookedApp:willEnterForeground, hookedApp:didEnterBackground, hookedApp:willResignActive, etc.) when the original callback methods are invoked by mobile OS 190, for example, when workspace application 170 is running in a background loop 270 or foreground loop 240, and an "event" (e.g., incoming phone call, end user interaction with the mobile device 150, etc.) such as 250 or 280 occurs as depicted in FIG. 2. Execution block 340 depicts the actions taken by hooked implementations of callback methods when a "reason" value exists (e.g., indicating a specific reason or entry path to callback method 230 as previously discussed). In particular, hooked implementations of the callback methods in execution block 340 address scenarios where workspace application 170 has entered background loop 270 because it has "flipped" (see, e.g., execution block 330) execution control to application management agent 180 in order to register workspace application 170 with virtual business workspace 160 or authenticate the user by, for example, presenting a PIN lock screen. In contrast, execution block 350 addresses scenarios where workspace application 170 has entered background loop or foreground loop during normal operations (i.e., the "reason" value is no longer set). For example, as can be seen in FIG. 3, the hooked implementations of callback methods hookedApp:didEnterBackground and hookedApp:willResignActive simply call the corresponding original implementation.

Figure 4:
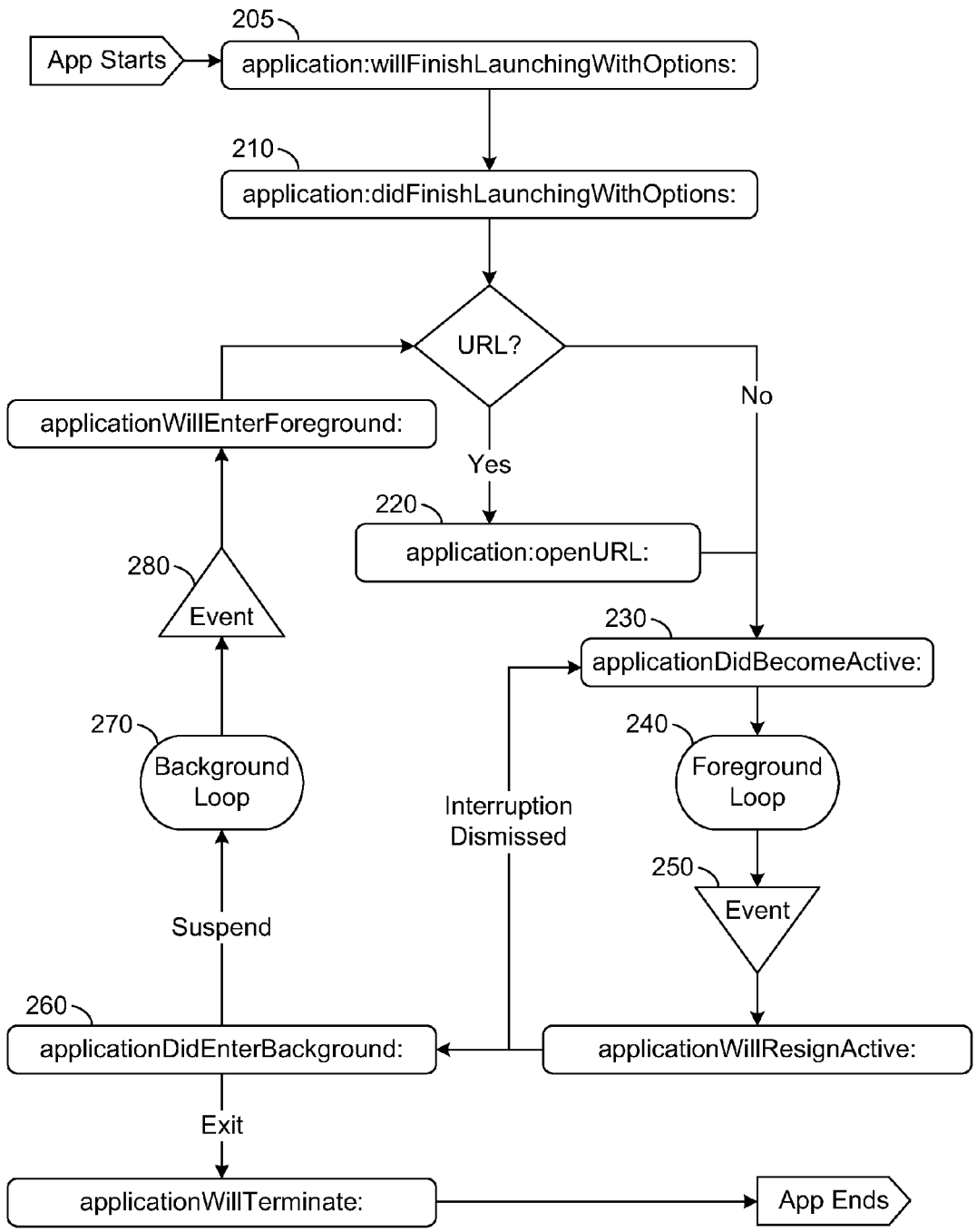
FIG. 4 presents a second flowchart illustrating a standard lifecycle flow for the various callback methods described above for a mobile application.

FIG. 4 presents a flowchart illustrating a standard lifecycle flow for the various callback methods described above for a mobile application running on Apple's iOS 6.x operating system. FIG. 4 is similar to FIG. 2 except that Apple's iOS 6.x operating system further introduces a framework for carrying out view checkpoint and restoration across application execution. To facilitate this new framework, the application lifecycle of FIG. 5 includes an additional callback method 205, application:willFinishLaunchingWithOptions, to perform a first round of initialization for workspace application 170, after which mobile OS 190 invokes various callback methods similar to the flow in FIG. 2

Figure 5:
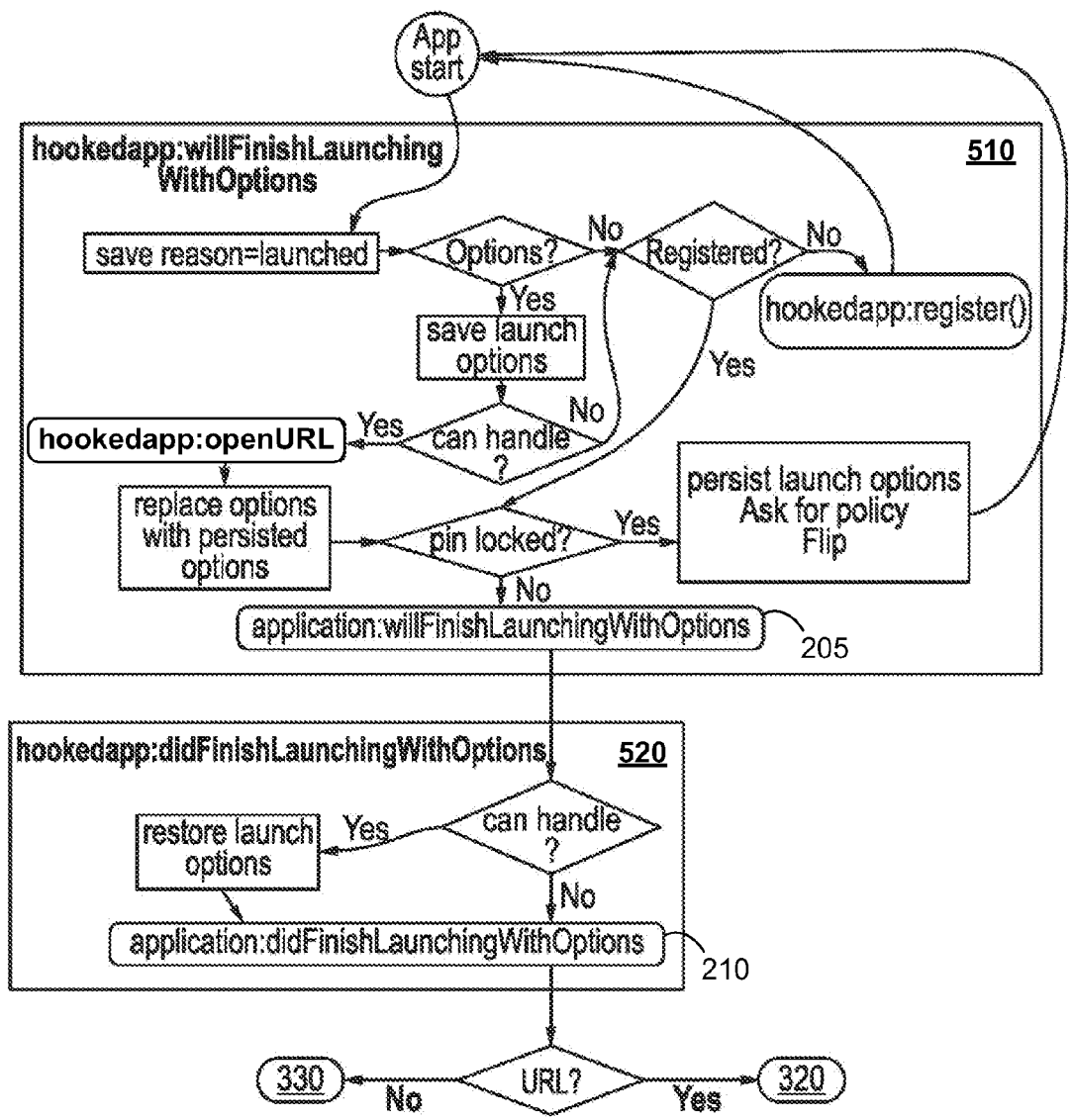
FIG. 5 presents one embodiment of a flowchart for hooking code that is inserted to interpose new tasks and functionality to enforce security policies of a corporation during the lifecycle of a workspace application depicted in FIG. 4.

FIG. 5 presents one embodiment of a flowchart for hooking code that is inserted to interpose new tasks and functionality to enforce security policies of a corporation during the lifecycle of a workspace application to leverage the additional checkpoint and restoration framework provided by the application:willFinishLaunchingWithOption callback method depicted in FIG. 4. As depicted in FIG. 5, in one iOS embodiment in which the lifecycle of workspace application 170 conforms with the flow of FIG. 4, the hooked implementation hookedApp:willFinishLaunchingWithOptions 510 persists the original launch options as well as checks and performs registration and user authentication. As further depicted, execution of the original implementations of certain callback methods (including application:willFinishLaunchingWithOptions and application:didFinishLaunchingWithOptions) in FIG. 5 are handled "in place" by the respective hooked implementations of the methods, rather than deferring execution of all callback methods implying foreground execution to the hooked implementation of applicationDidBecomeActive. However, in particular embodiments, execution of one or both of these callback methods may be deferred until the hooked implementation of applicationDidBecomeActive in execution block 330.

It should be recognized that the foregoing embodiments whereby corporation 110 interposes functionality into the lifecycle of the UIApplicationDelegate object of an iOS implementation of workspace application 170 to support the security policies is merely one example of a situation in which the techniques disclosed herein may be utilized. Other situations may be envisioned in which other types of functionality may be interposed to enforce other security policies, or other callback methods or methods for other objects may be hooked in order to enforce the security policies. For example, although the foregoing embodiments generally described registration and user authentication as examples of custom functionality provided in hooked implementation of callback methods, it should be recognized that other functionality provided in other embodiment might include checking to see if a security policy or credential supplied by application management agent 180 may have timed out or may need a refresh, deciding if workspace application 170 needs to "flip" to the application management agent 180 for any another reason (e.g. workspace application 170 has been upgraded and needs to communicate the new version info to application management agent 180), performing a virus scan, allowing an application from one version of mobile OS 190 to run on another version of mobile OS 190, and the like. As such, although one or more embodiments of the present invention have been described in some detail for clarity of understanding, it will be apparent that certain changes and modifications may be made within the scope of the claims. For example, while embodiments herein have referred to certain operating systems such as Apple iOS, it should be recognized that other operating systems providing callback methods during an application's lifecycle may be utilized in alternate embodiments, such as the Android operating system, Open WebOS operating system, Java-based operating system, the Blackberry operation and the like. In addition, other operating systems that provide similar functionality may also be utilized in alternate embodiments, such as Research in Motion's Blackberry operating system (e.g., event handling using the Blackberry Platform Framework), Microsoft's Windows Phone (e.g., event handling using "tombstoning"), and the like. It should further be recognized that use of certain terminology that may be more commonly used with certain operating systems than others is merely exemplary not meant to limit the scope of the teachings herein to any particular operating system and that corresponding functions and components in other operating system platforms may benefit from the teachings herein. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Disc)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method to authenticate a user of an application running on a mobile operating system (OS) installed on a mobile device, wherein the mobile OS invokes callback methods of the application upon making changes to an execution state of the application, the method comprising:

embedding code into an executable version of the application prior to installation of the application on the mobile device, wherein the embedded code is configured to hook into at least one of the callback methods to cause the application to communicate with a management agent installed in the mobile OS prior to execution of the at least one callback method;

upon the mobile OS triggering a change in execution state of the application to a foreground state, and upon the mobile OS invoking the at least one callback method of the application, executing the embedded code to determine whether the user should be provided an authentication challenge prior to enabling the application to run in the foreground state;

in response to determining that the user should be provided the authentication challenge, invoking the management agent by execution of the embedded code to present the authentication challenge to the user through a user interface of the mobile device; and returning execution control from the management agent back to the application wherein the application executes the at least one callback method prior to running in the foreground state.

2. The method of claim 1, wherein the mobile OS switches execution control from the application to the management agent to enable the management agent to present the authentication challenge.

3. The method of claim 2, wherein the timeout value corresponds to whether any of plurality of business-approved applications installed on the mobile device has been recently used.

4. The method of claim 1, wherein the step of executing the embedded code comprises determining whether a timeout value stored in the mobile device has expired.

5. The method of claim 1, further comprising requesting the management agent to register the application as a business-approved application if the application has not been registered.

6. One or more computer-readable non-transitory storage media embodying software to authenticate a user of an application running on a mobile operating system (OS) installed on a mobile device, wherein the mobile OS invokes callback methods of the application upon making changes to an execution state of the application, and wherein the software is operable when executed to:
  embed code into an executable version of the application prior to installation of the application on the mobile device, wherein the embedded code is configured to hook into at least one of the callback methods to cause the application to communicate with a management agent installed in the mobile OS prior to execution of the at least one callback method;
  upon the mobile OS triggering a change in execution state of the application to a foreground state, and upon the mobile OS invoking the at least one callback method of the application by the mobile OS, execute the embedded code to determine whether the user should be provided an authentication challenge prior to enabling the application to run in the foreground state;
  in response to determining that the user should be provided the authentication challenge, invoke the management agent by execution of the embedded code to present the authentication challenge to the user through a user interface of the mobile device; and
  return execution control from the management agent back to the application wherein the application executes the at least one callback method prior to running in the foreground state.

7. The media of claim 6, wherein the mobile OS switches execution control from the application to the management agent to enable the management agent to present the authentication challenge.

8. The media of claim 6, wherein the software is operable to execute the embedded code to determine whether a timeout value stored in the mobile device has expired.

9. The media of claim 8, wherein the timeout value corresponds to whether any of plurality of business-approved applications installed on the mobile device has been recently used.

10. The media of claim 6, wherein the software is further operable when executed to request the management agent to register the application as a business-approved application if the application has not been registered.

11. A system comprising:
  one or more processors; and
  a memory coupled to the processors comprising instructions executable by the processors to authenticate a user of an application running on a mobile operating system (OS) installed on a mobile device, wherein the mobile OS invokes callback methods of the application upon making changes to an execution state of the application, the processors being operable when executing the instructions to:
    embed code into an executable version of the application prior to installation of the application on the mobile device, wherein the embedded code is configured to hook into at least one of the callback methods to cause the application to communicate with a management agent installed in the mobile OS prior to execution of the at least one callback method;
    upon the mobile OS triggering a change in execution state of the application to a foreground state, and upon the mobile OS invoking the at least one callback method of the application, executing the embedded code to determine whether the user should be provided an authentication challenge prior to enabling the application to run in the foreground state;
    in response to determining that the user should be provided the authentication challenge, invoke the management agent by execution of the embedded code to present the authentication challenge to the user through a user interface of the mobile device; and
    return execution control from the management agent back to the application wherein the application executes the at least one callback method prior to running in the foreground state.

12. The system of claim 11, wherein the mobile OS switches execution control from the application to the management agent to enable the management agent to present the authentication challenge.

13. The system of claim 11, wherein the processors are further operable when executing the instructions to execute the embedded code to determine whether a timeout value stored in the mobile device has expired.

14. The system of claim 13, wherein the timeout value corresponds to whether any of plurality of business-approved applications installed on the mobile device has been recently used.

* * * * *